US006240611B1

(12) United States Patent
Chase

(10) Patent No.: US 6,240,611 B1
(45) Date of Patent: Jun. 5, 2001

(54) STARTER SPRING REWINDER

(76) Inventor: Donald L. Chase, 21 Pleasantdale Cir., Greenville, SC (US) 29607

( * ) Notice: Subject to any disclaimer, the term of this patent is extended or adjusted under 35 U.S.C. 154(b) by 0 days.

(21) Appl. No.: 09/537,140

(22) Filed: Mar. 29, 2000

(51) Int. Cl.[7] .......... B23P 19/04
(52) U.S. Cl. .......... 29/228; 81/7.5
(58) Field of Search .......... 81/7.5; 29/225, 29/226, 227, 228, 240, 240.5

(56) References Cited

U.S. PATENT DOCUMENTS

| | | |
|---|---|---|
| 973,045 | 10/1910 | Hobb et al. . |
| 2,563,112 | 8/1951 | Hill et al. . |
| 2,717,527 | 9/1955 | Rapp . |
| 3,263,532 | 8/1966 | Amberg . |
| 3,748,716 | 7/1973 | Fidler . |
| 3,894,743 | 7/1975 | Hiroumi . |
| 4,183,268 | 1/1980 | Anderson . |
| 4,807,347 | 2/1989 | Johnson . |
| 5,113,561 | 5/1992 | Scott . |

*Primary Examiner*—Robert C. Watson
(74) *Attorney, Agent, or Firm*—Dority & Manning, P.A.

(57) ABSTRACT

A tool for coiling spring and holding the coiled spring for replacing strip type spring used in equipment such as chain saws, weed cutting implements, etc. The spring is coiled within a cap that has an ejector plate provided therein as well as a spring holder. Once the spring is wound within the cap, the spring holder is moved relative to the cap to release the inner end of the spring and the ejector plate is used for pushing the plate out of the cap into a pull cord starting housing of an internal combustion engine.

7 Claims, 7 Drawing Sheets

Fig. 4A
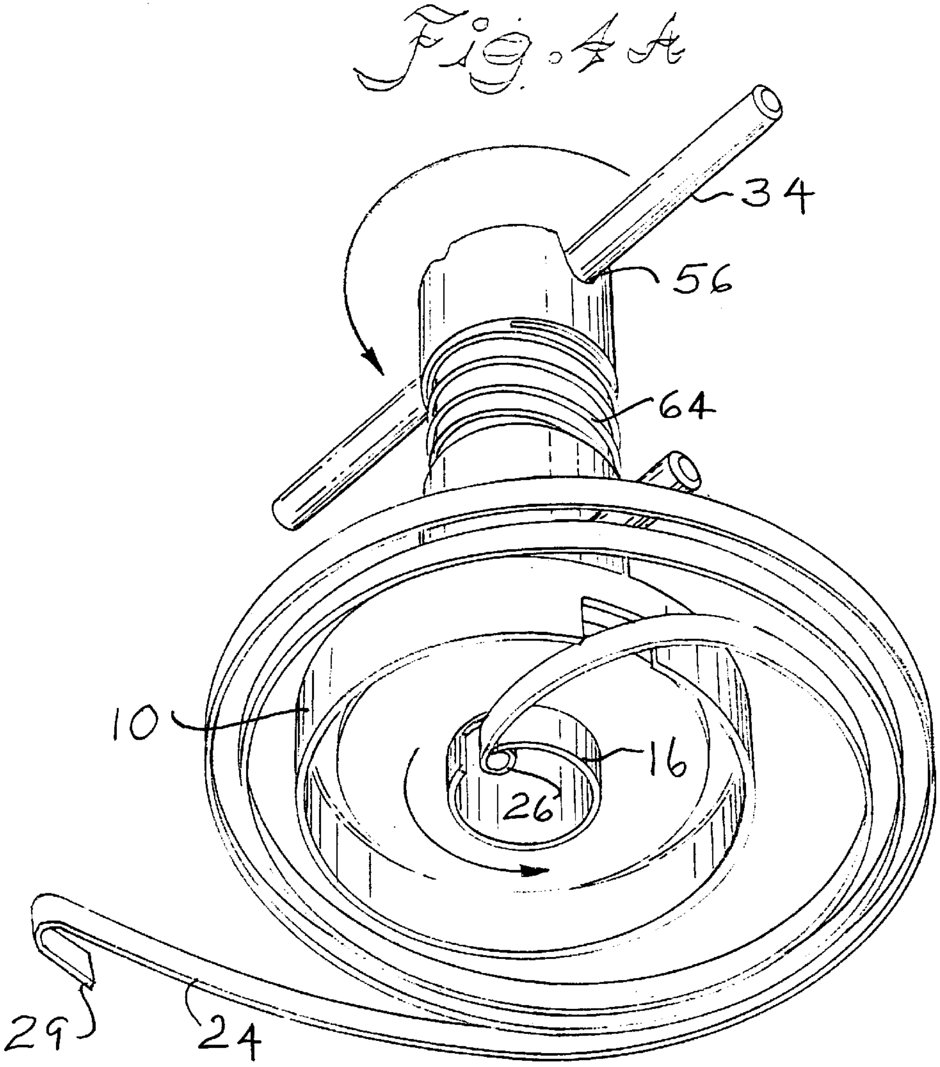
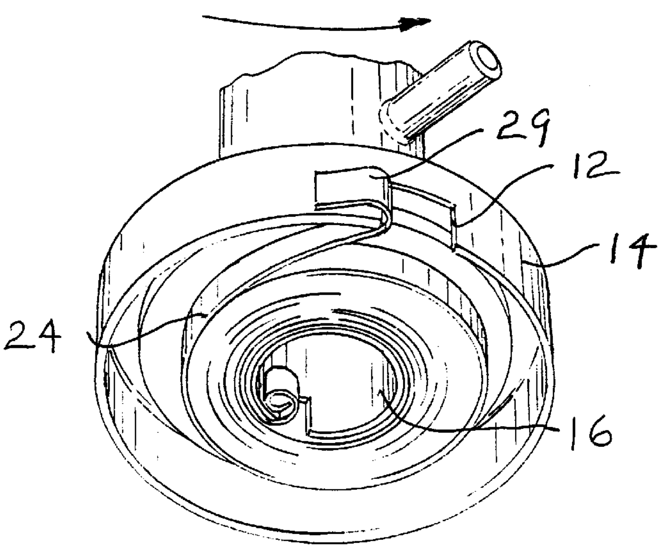
Fig. 4B 30
29
74
24
27
77
76

STARTER SPRING REWINDER

BACKGROUND OF THE INVENTION

The present invention relates to a device for rewinding and replacing strip type springs of concentric coils in equipment such as chain saws, weed cutting implements, etc. and in particular relates to a device for rewinding starter springs used in pull-cord starting mechanisms of internal combustion engines.

Heretofore, when it was necessary to replace a strip type spring used in conjunction with pull-cord starting mechanisms of internal combustion engines, it was generally done by hand requiring a person to wind the spring in a tight coil and then place the spring within the housing of the equipment. This was a tedious, difficult and time consuming operation. Attempts have been made to produce tools for accomplishing this purpose and several patents have been granted showing and describing such tools. Some of the previous tools require the operator to wind the spring, remove the wound spring by hand and place the spring in the housing using one's hands or plyers. The handling of the spring often resulted in the spring becoming unwound, thus having to repeat the procedure again from the beginning.

SUMMARY OF THE INVENTION

It is a principal object of the present invention to provide a tool for readily winding a strip type spring and placing the spring in the housing of a gas operated engine.

Another object of the invention is to provide an improved spring coiling device which is easy to operate and is of a simple construction.

Still another important object of the present invention is to provide a spring coiling device that enables unskilled people to readily rewind a spring and place it in equipment such as chain saws, weed cutting implements, etc.

Still another important object of the present invention is to provide a starter spring rewinder which can be safely used for rewinding a starter spring and inserting the starter spring in the housing of equipment in a safe and easy manner.

The tool constructed in accordance with the present invention for coiling a spring and holding the coiled spring for insertion in a housing of an implement includes a cylindrical spring cap having a downwardly extending flange. A window is provided in the downwardly extending flange through which an end of a flat spring to be coiled is inserted. An inner housing extends into the cylindrical spring cap and has an ejector plate supported on a remote end thereof. A vertically extending bore is provided in a lower end of the inner housing for permitting a spring holder to extend vertically therein.

A hole is provided in the ejector plate through which the spring holder extends into the spring cap. The spring holder is carried on a lower end of the spring loaded plunger for holding an end of a spring to be coiled when in a first extended position and for releasing the end of the spring to be coiled when retracted to a second position.

A handle is carried by an upper end of the spring loaded plunger for rotating the plunger and the spring holder for drawing the spring to be coiled through the window in the cap and coiling the spring within the cap. The handle is also used for raising the plunger to release the coiled spring from the spring holder.

The spring coiling cap is supported on a lower end of a movable housing so that upon raising the movable housing, the ejector plate can be moved from an upper position within the coiling cap to a position outside of the coiling cap. A finger grip is carried on the surface of the movable housing for raising the movable housing and cap relative to the ejector plate for ejecting the coiled spring from the cap when placing the spring in the housing of the implement.

The spring holder member is a tubular member having a slotted opening provided in a side wall thereof. When a spring is to be coiled, an enlarged portion adjacent the end of the spring is inserted within the tubular member and extends through the slotted opening provided in the side wall for preventing the enlarged end of the spring from being pulled through the holder during the coiling operation of the spring.

The tool also has a control cap carried on top of the plunger which has a first slot provided in the upper surface thereof of a first depth. A second slot is transversely disposed in the upper surface of the control cap from the first slot and is of a different depth. The depth of the first and second slots provided in the upper surface of the control cap are dimensioned to receive the handle carried by the spring loaded plunger so that when the handle is positioned in one slot it holds the spring holder member in the spring cap and when the handle is in the second slot the spring holder member is pulled upward into the base of the inner housing to release the spring being coiled.

The spring cap is threadably secured to a lower end of the movable housing so that the spring cap can be removed from the movable housing and another spring cap of a different size can be placed on the movable housing for coiling springs of a different size. The ejector plate is also threadably secured on the end of the inner housing so that it can be changed and an ejector plate of a different size can be placed on the end of the inner housing.

The invention will be further understood by reference to the following detailed description of an embodiment of the invention taken in conjunction with the drawings, in which:

BRIEF DESCRIPTION OF THE DRAWINGS

FIG. 4*a* is a perspective view of the tool taken from the bottom illustrating the position of the spring prior to being wound;

FIG. 4*b* is a perspective view of the tool taken from the bottom showing a spring in a coiled position;

DETAILED DESCRIPTION

Figure 1:
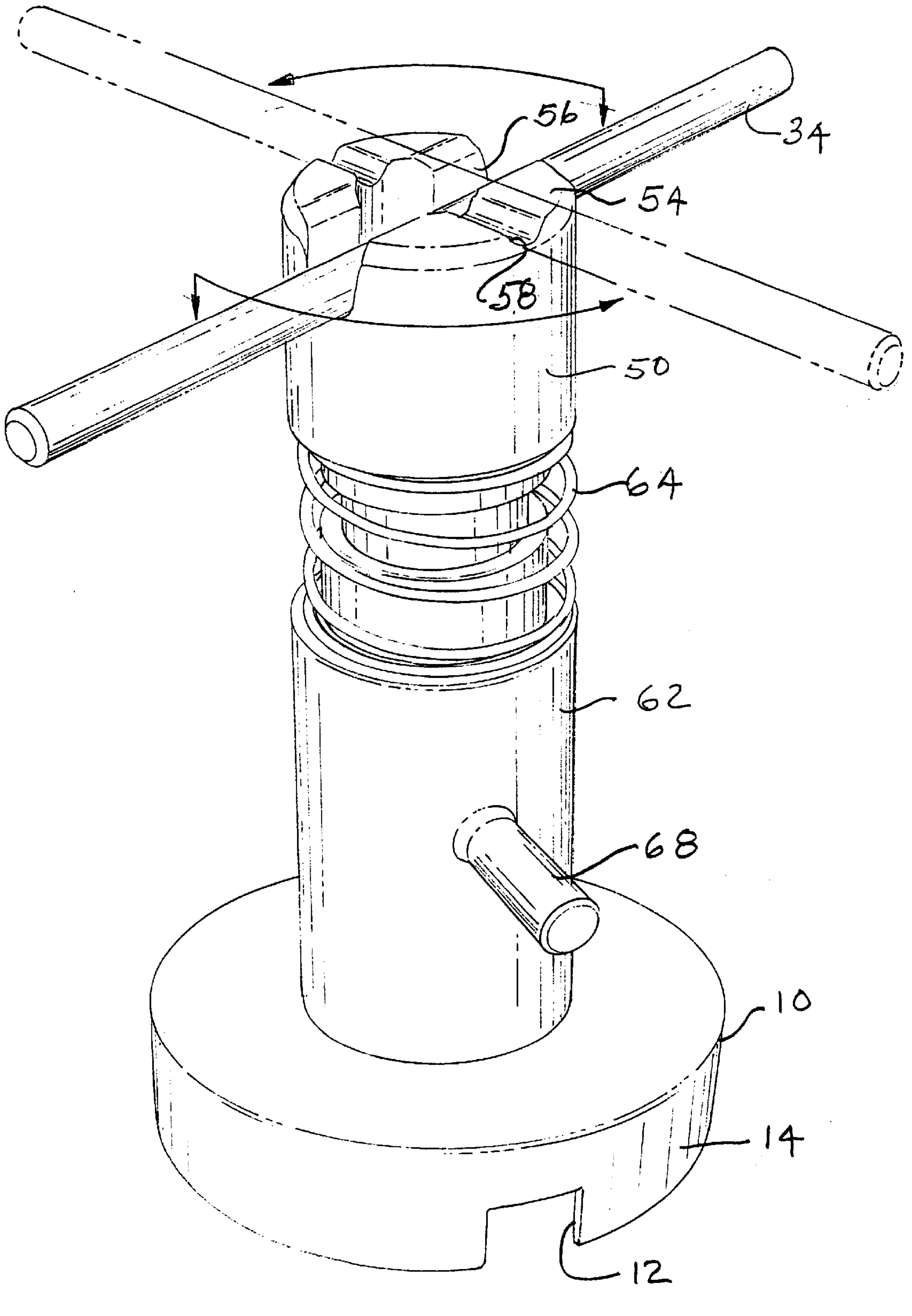
FIG. 1 is a perspective view of a tool constructed in accordance with the present invention.
Figure 2:
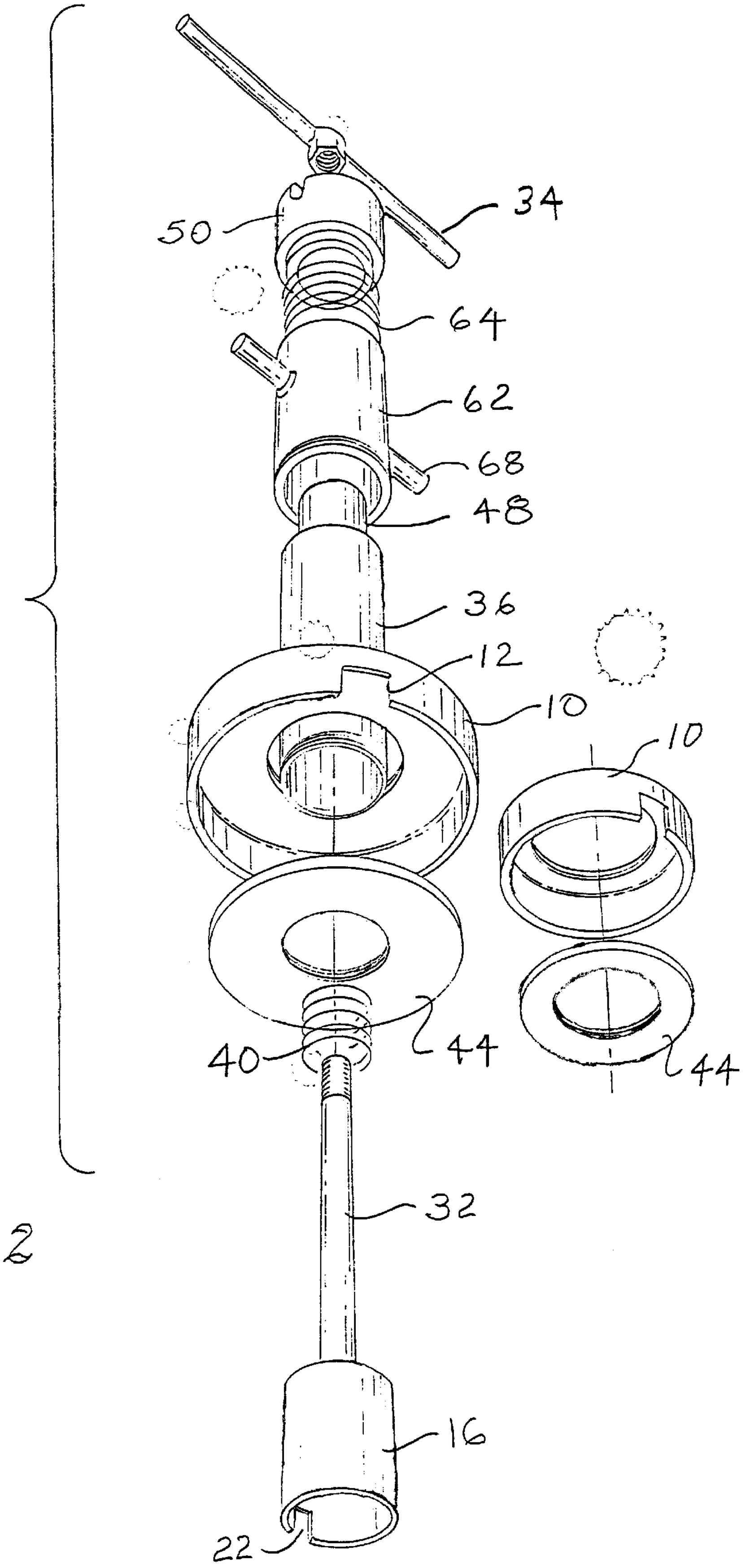
FIG. 2 is an exploded view of the tool shown in FIG. 1.
Figure 3:
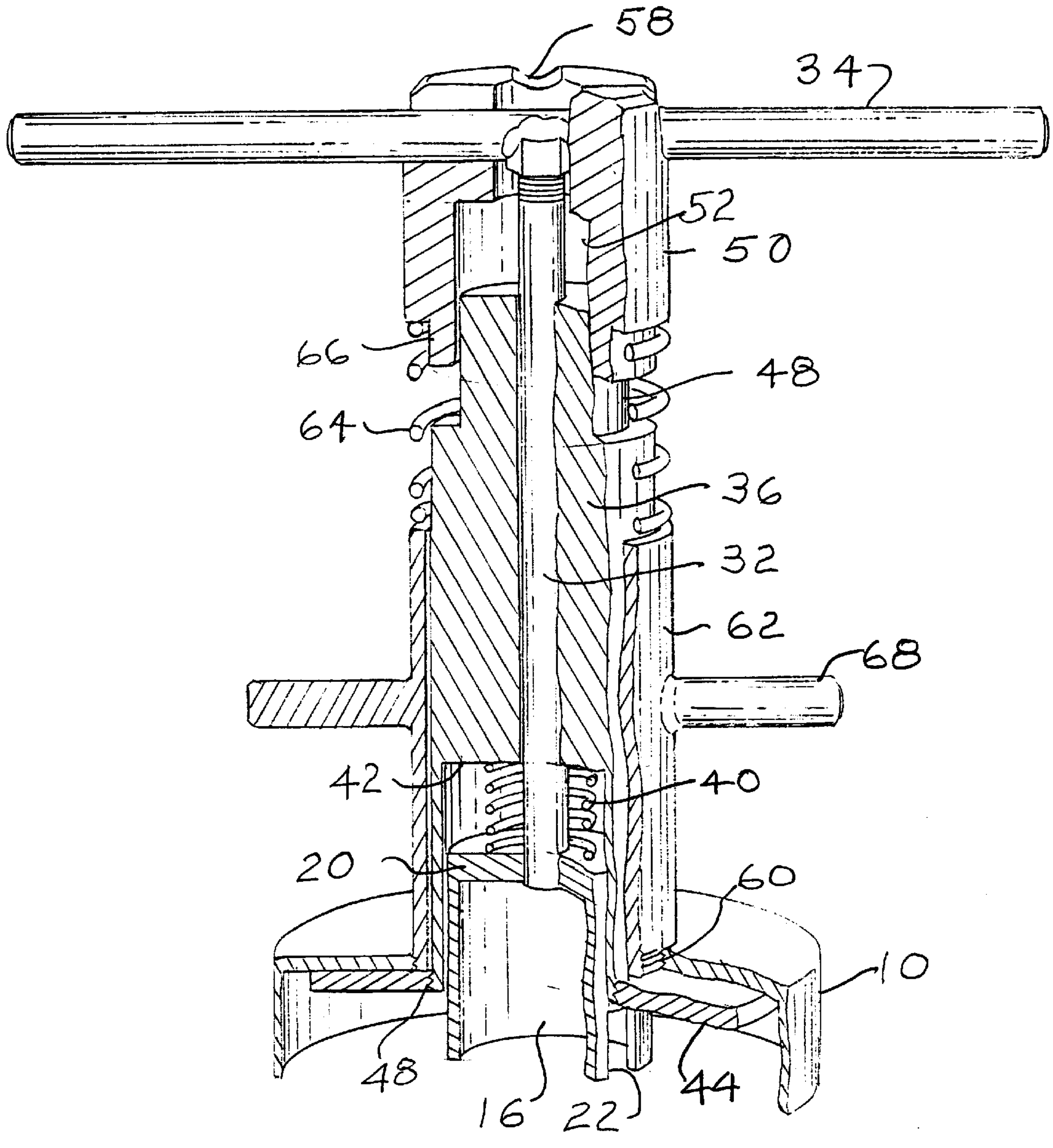
FIG. 3 is a sectional view of the tool.

Referring to FIGS. 1–3, there is shown a tool that can be used for replacing a strip type spring that is attached to a pulley that carries a pull cord for starting small gasoline engines. These springs often break, requiring the broken spring to be removed from a housing that normally carries the spring. Once the broken spring has been removed from the housing, it is necessary to insert another coiled spring therein. When inserting the spring into the engine housing, it is necessary that the spring be coiled and properly positioned within the housing with one end thereof secured to a fixed post within the housing and the other end attached to a post carried by a pulley wheel. Upon pulling the rope to start the engine, the pulley wheel is rotated causing the spring to be coiled into a tighter coil. Upon releasing the rope, the pulley wheel is rotated in the opposite direction by the coiled spring to rewind the rope on the pulley wheel.

In FIGS. 1, 2 and 3 there is disclosed a tool for coiling the replaceable strip type spring. The tool includes a cap 10 into which the spring is coiled for subsequent placement in the housing of the gas engine. The cap 10 has a slot 12 provided in a downwardly extending side wall 14 through which the spring is inserted. One end of the spring is secured to a spring holder 16 that can be rotated for drawing the spring into the spring cap 10. The spring holder 16 is a tubular housing having a side wall 18 with an open bottom and closed top 20. It is cylindrical in shape. A slot 22 is provided in the side wall 18 of the spring holder. When loading the spring within the spring cap 10 a bent back end having a looped portion 26 is positioned within the wall 18 of the holder 16 and the remainder of the spring 24 extends through the slot 22 in the spring holder 16 and out of the slot 12 provided in the spring cap. As a result, by rotating the spring holder 16 a strip type spring 24 can be wound within the spring cap as illustrated in FIGS. 4*a* and 4*b*. The looped portion 26 of the spring 24 is provided to fit on a post carried on the rope pulley (not shown).

The spring holder 16 is carried on a lower end of a plunger 32 and is fixed thereto. Positioned on the upper end of the plunger 32 is a cross handle 34.

The plunger extends through an inner housing 36 which has an elongated vertically extending passage therethrough. The lower end of the housing has a cylindrical bore 37 provided therein into which the spring holder 16 extends. A spring 40 is interposed between a top portion 42 of the bore 37 and the top 20 of the spring holder 16. As a result, the plunger spring 40 tends to force the spring holder 16 to a down first position such as shown in FIG. 3.

Positioned on the lower end of the inner housing 36 is a cylindrical ejector disc 44. The disc 44 has a diameter slightly less that the inner diameter of the spring cap 10. The disc 44 has an opening provided in the center thereof which has threads 46 positioned thereon so that it can be screwed onto threads 48 carried on a lower end of the inner housing 36. The ejector disc 44 is provided to move with the inner housing from a first position such as shown in FIG. 3 when the strip type spring 24 is being wound within the spring cap 10 to a lower spring ejector position. In order to push the coiled spring 24 out of the spring cap 10, when the cap 10 is raised the inner housing 36 assumes a second position relative to cap 10 wherein the disc 44 extends out below the bottom surface of the spring cap as shown in FIG. 5*b* to insert the coiled spring 24 in the housing 30 of the gas engine with the bent portion 29 being secured to the post 27.

The inner housing 36 is cylindrical in shape and has a reduced diameter portion 48 adjacent the top thereof. A control knob 50 is placed on top of the reduced diameter portion of the inner housing. The control knob 50 has a cylindrical bore 52 provided adjacent the lower end thereof which slides over the reduced diameter portion 48 of the inner housing 36. The upper portion of the control knob 50 is closed by a top 54. Two diametrically opposed slots 56 and 58 are provided in the top 54. The purpose of the slots is to provide an up detent position when the handle 34 is located in slot 58 such as shown in FIG. 1 and to provide a down detent position such as shown by the full lines of the handle 34 wherein the handle extends through the slot 56. The depth of the slot 58 is less than the depth of the slot 56. As a result, when the handle 34 extends through the slot 58, the spring holder is raised. When the handle 34 is rotated so that is rests within the lower detent position provided by the slot 56 the spring holder 16 is lowered to the first position such as shown in FIG. 3.

The spring cap 10 has a cylindrical threaded bore provided in the center thereof into which a lower end 60 of a movable housing 62 is threaded. Threads are provided between the lower end of the housing 60 and the cylindrical opening provided in the spring cap 10. The movable housing 62 is tubular in shape and has an inner diameter slightly larger than the exterior diameter of the inner housing 36 so that the movable housing 62 can slide up and down on the inner housing 36. A push spring 64 is inserted around the inner housing 36 and has a lower end resting on a top surface of the tubular movable housing 62 and an upper end thereof encircling a reduced diameter flange 66 carried on the lower end of the control knob 50. As a result, the movable housing when at rest is pushed downwardly flush against the upper surface of the ejector plate 44 as shown in FIG. 3.

Figure 5A:
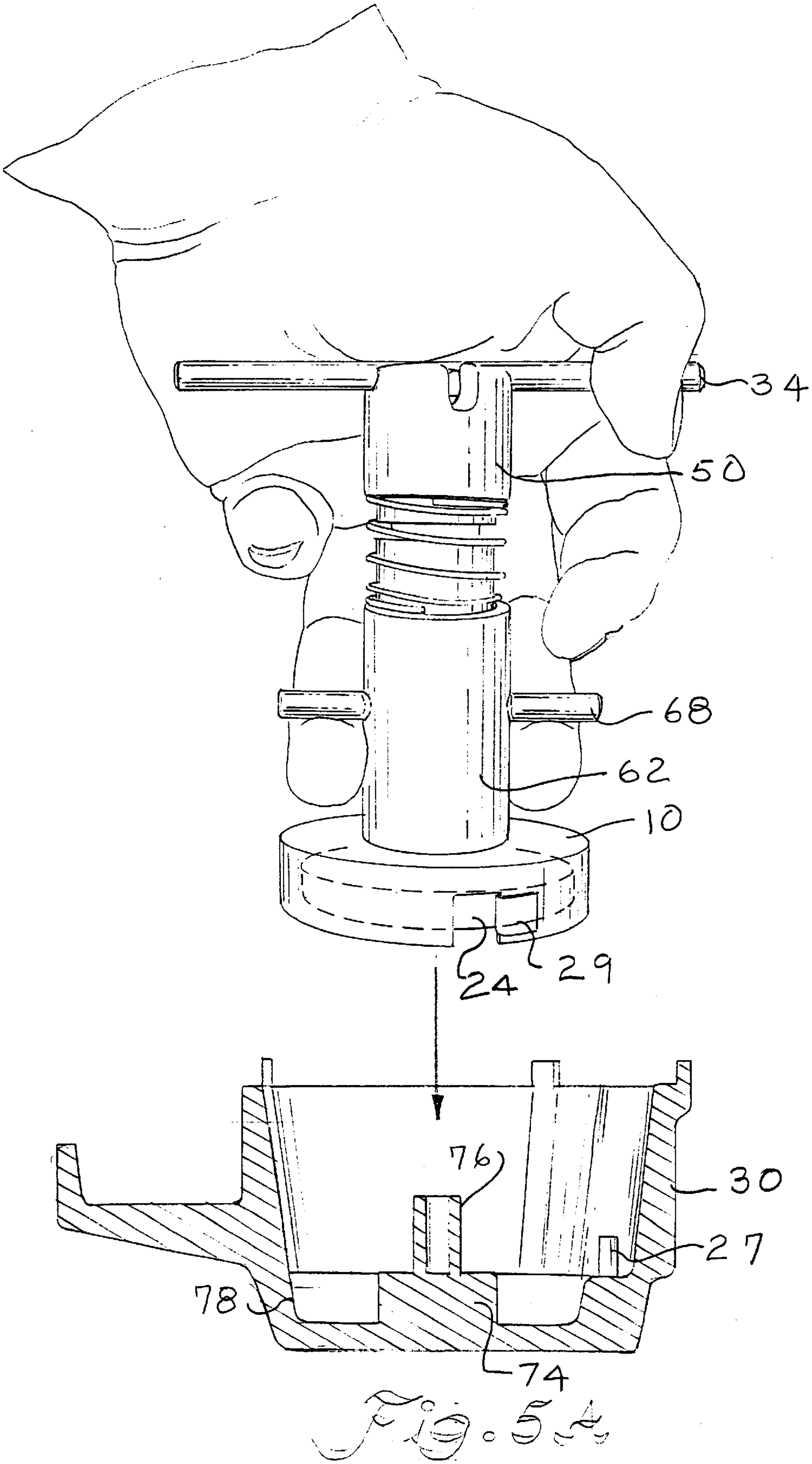
FIG. 5*a* is a perspective view of the tool showing it being inserted in a housing of the implement for placing a coiled spring therein.
Figure 5B:
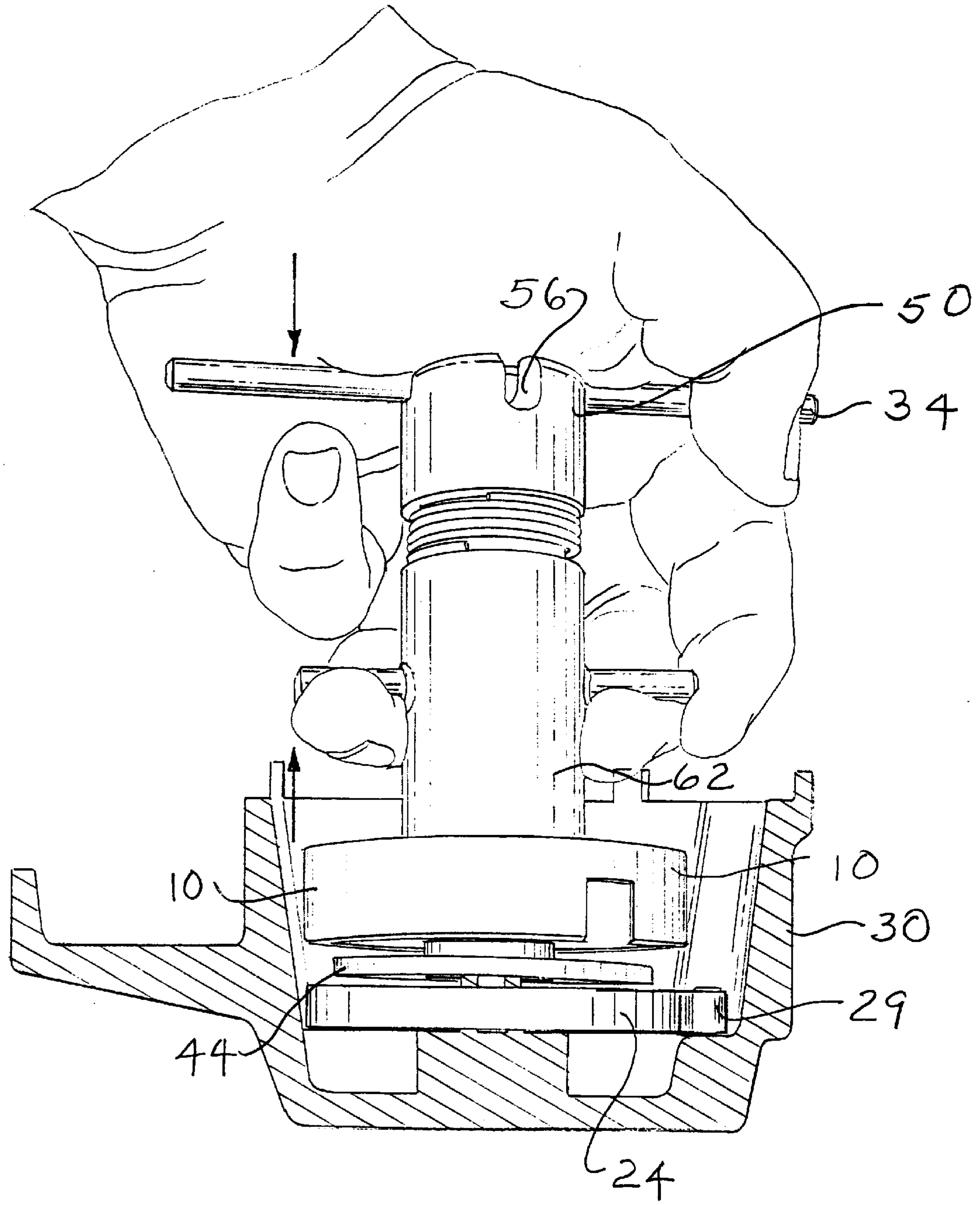
FIG. 5*b* is a perspective view of the tool inserting the coiled spring in the housing of the implement.

Finger grips 68 extend radially outward from the movable housing 62 so that by gripping the tool in one hand and pulling upwardly against the finger grips the movable housing slides upwardly over the outer surface of the inner housing 36 to cause the spring cap to move upwardly relative to the ejector plate to a position such as shown in FIG. 5*b* wherein the ejector plate pushes a coiled spring 24 from the lower end of the spring cap.

The purpose of threadably securing the ejector plate on the lower end of the inner housing and threadably securing the spring cap on the lower end of the movable housing 62 is to permit the spring cap 10 and ejector plate 44 to be changed for a different size spring cap 10 and ejector plate 44 so as to replace springs 24 used with different types and sizes of internal combustion engines.

Figure 6:
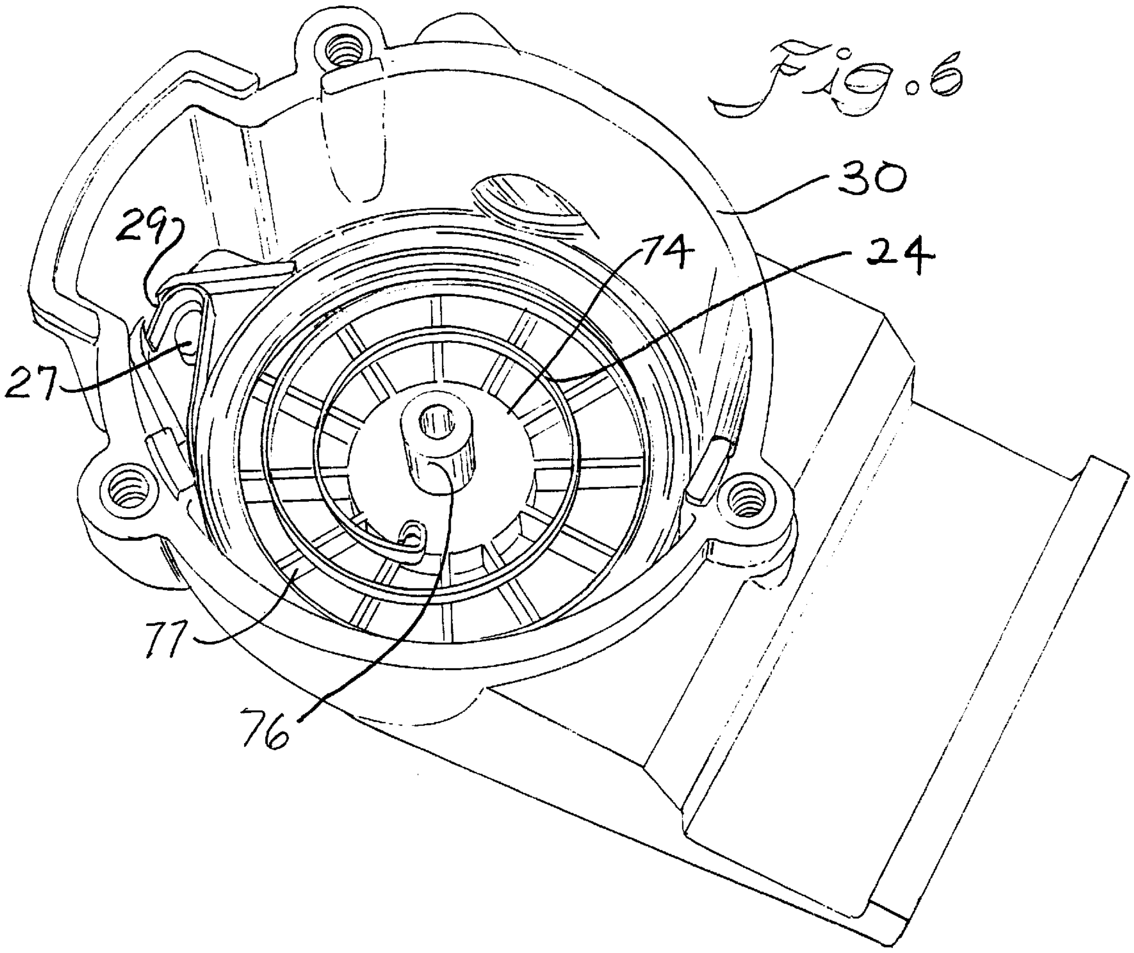
FIG. 6 is a plan view taken from the bottom illustrating the housing of the implement with the coiled spring within the housing.

The housing 30 into which the spring is to be inserted is illustrated in FIGS. 5*a*, 5*b*, and 6 and includes a base 70 having a cylindrical groove 72 provided therein. A raised cylindrical bearing surface 74 is provided in the center thereof and has a tubular post 76 extending upwardly therefrom. The anchoring post 27 extends upwardly from the upper portion of the base 70 of the housing 30. Spokes 77 extend from the side walls of the cylindrical supporting surface 74 to the inner wall 78 for supporting the spring 24 within the housing 30.

When the spring 24 is inserted in the housing 30, the outer end of the spring which has a hook-shaped portion 29 thereon extends around the post 27. The spring 24 extends over the top of the spokes 77 with the inner end of the spring 26 being free. As previously discussed, the inner end of the strip type spring 24 has a loop portion 26 provided thereon. The purpose of this loop portion 26 is to receive a post carried on the upper surface of the pulley wheel around which the pull cord is wound. As a result, when the pull cord is pulled out of the housing 30 through the passage 80, the spring 24 is wound into a tighter coil. Upon releasing the pull cord, the spring rotates the pulley wheel and winds the cord back into the housing 30. The hook portion 29 of the outer end of the coiled spring extends around the post 27 so as to restrict the movement of the outer end of the spring during the coiling operation as the pull cord is pulled from the housing.

In order to wind the strip type spring 24 in the spring cap 10 the inner end 26 of the strip type spring 24 is positioned inside the spring holder 16 allowing the spring to extend through the slot 22 provided therein. At this time, the ejector plate 44 is in a raised position such as shown in FIG. 3 and the spring holder 16 is in a lower first position such as also shown in FIG. 3. The handle 34 extends through the down position slots 56 provided in the control knob 50. The operator rotates the handle causing the control knob 50 and the spring holder to rotate. He continues rotating the handle until the spring is completely within the spring cap 10 with the exception of the end portion 29.

After the spring has been wound within the spring cap 10, the operator pulls up on the handle 34 while holding the tool flat on a surface and rotates the handle 90 degrees on the control cap 50 to the up position wherein the handle extends through the slot 58. This will release the looped portion 26 from the spring holder 16. At this time, the operator positions the tool over the housing 30 of the gasoline engine and inserts the center of the spring holder 16 over the post 26. He also positions the loop portion 29 of the outer end of the spring directly over the upstanding post 27 provided in the housing 30. He then pulls up on the finger grips 68 causing the movable housing 62 to be raised relative to the inner housing 36. This in turn causes the ejector plate 42 to push the coiled spring out of the lower end of the housing.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A tool for coiling a spring and holding said coiled spring for insertion in a housing of an implement comprising:

a cylindrical spring cap having a downwardly extending flange, a window provided in said downwardly extending flange through which an end of flat spring to be coiled is inserted;

an inner housing;

an ejector plate, carried within said cap and supported by said inner housing;

a hole provided in said ejector plate;

a spring loaded plunger having an upper end and a lower end, said spring loaded plunger extending through said inner housing;

a spring holder carried on a lower end of said spring loaded plunger for holding an end of a spring to be coiled when in a first extended position and for releasing said end of said spring to be coiled when retracted to a second position;

said spring holder extending through said hole in said ejector plate into said cap when in said first extended position;

a movable housing supporting said cylindrical spring cap;

a spring forcing said movable housing and said cap downwardly relative to said inner housing holding said ejector plate adjacent a top inner portion of said cap, a handle carried by an upper end of said spring loaded plunger for rotating said plunger and said spring holder for drawing said spring to be coiled through said window in said cap and coiling said spring within said cap and for raising said plunger within said cap to said second position to release said coiled spring from said spring holder; and a gripping surface carried by said movable housing for raising said movable housing and said cap relative to said ejector plate for ejecting said coiled spring from said cap into said housing of said implement.

2. The tool as set forth in claim 1 wherein said spring to be coiled has an enlarged portion adjacent an inner end thereof and wherein said spring holder member is a tubular member including a side wall, a slotted opening provided in said side wall for preventing said enlarged end of said spring from being pulled through during the coiling of said spring.

3. The tool as set forth in claim 1 further comprising;

a control cap carried on top of said plunger;

a first slot provided in an upper surface of said control cap of a first depth;

a second slot transversely disposed in said upper surface of said control cap from said first slot and being of a second depth;

said first and second slots being dimensioned to receive said handle carried by said spring loaded plunger, wherein when said handle is positioned in said first slot, said spring holder member is positioned for holding said end of said spring to be coiled and when said handle is positioned in said second slot said spring holder member is in said second position for releasing said end of said coiled spring.

4. The tool as set forth in claim 1 further comprising:

said spring cap being removably secured to a lower end of said movable housing so that said spring cap can be removed from said movable housing and another spring cap of a different size can be placed on said movable housing for coiling a spring of a different size.

5. The tool as set forth in claim 4 further comprising:

said ejector plate being removably secured to said inner housing so that said ejector plate can be removed and another ejector plate of a different size can be substituted therefor.

6. The tool as set forth in claim 1 wherein said gripping surface is a pair of outwardly extending projections that can be readily gripped by one's fingers for raising said movable housing and said cap relative to said ejector plate.

7. A tool for coiling a spring and holding said coiled spring for insertion in a housing of an implement comprising:

a cylindrical spring cap having a downwardly extending flange, a window provided in said downwardly extending flange through which an end of flat spring to be coiled is inserted;

an inner housing;

an ejector plate, carried within said cap and supported by said inner housing;

a spring loaded plunger having an upper end and a lower end, said spring loaded plunger extending through said inner housing;

a spring holder carried on a lower end of said spring loaded plunger for holding an end of a spring to be coiled when in a first extended position and for releasing said end of said spring to be coiled when retracted to a second position;

said spring holder extending through said hole in said ejector plate into said cap when in said first extended position;

a movable housing supporting said cylindrical spring cap;

a spring forcing said movable housing and said cap downwardly relative to said inner housing holding said ejector plate adjacent a top inner portion of said cap, a gripping member carried by an upper end of said spring loaded plunger for rotating said plunger and said spring holder for drawing said spring to be coiled through said window in said cap and coiling said spring within said cap and for raising said plunger within said cap to said second position to release said coiled spring from said spring holder; and a gripping surface carried by said movable housing for raising said movable housing and said cap relative to said ejector plate for ejecting said coiled spring from said cap into said housing of said implement.

* * * * *